(12) United States Patent
Greenlee

(10) Patent No.: US 10,667,473 B2
(45) Date of Patent: Jun. 2, 2020

(54) GROW LIGHT SYSTEM

(71) Applicant: Garrett Greenlee, Columbus, OH (US)

(72) Inventor: Garrett Greenlee, Columbus, OH (US)

(*) Notice: Subject to any disclaimer, the term of this patent is extended or adjusted under 35 U.S.C. 154(b) by 315 days.

(21) Appl. No.: 15/627,580

(22) Filed: Jun. 20, 2017

(65) Prior Publication Data

US 2017/0359966 A1    Dec. 21, 2017

Related U.S. Application Data

(60) Provisional application No. 62/352,613, filed on Jun. 21, 2016.

(51) Int. Cl.
*A01G 9/26* (2006.01)

(52) U.S. Cl.
CPC .............. *A01G 9/26* (2013.01); *Y02A 40/274* (2018.01)

(58) Field of Classification Search
CPC . A01G 13/08; A01G 9/20; A01G 9/24; F16M 11/12; F21V 21/14
See application file for complete search history.

(56) References Cited

U.S. PATENT DOCUMENTS

| | | | | |
|---|---|---|---|---|
| 5,993,030 A | * | 11/1999 | Barcel | A01G 9/26 362/408 |
| 8,984,806 B2 | * | 3/2015 | Uchiyama | A01G 9/24 47/17 |
| 2017/0094914 A1 | * | 4/2017 | Paquette | F21V 14/006 |
| 2018/0213735 A1 | * | 8/2018 | Vail | A01G 31/06 |

* cited by examiner

*Primary Examiner* — Anh T Mai
*Assistant Examiner* — Zachary J Snyder

(57) ABSTRACT

An apparatus for growing plants in a grow room includes an enclosure having a window. The enclosure contains a grow lamp that is arranged to direct light downward through the widow toward the plants. A blower is coupled with the enclosure to drive a flow of air through the enclosure. A gantry apparatus supports the enclosure in the grow room for movement above the plants.

9 Claims, 7 Drawing Sheets

GROW LIGHT SYSTEM

RELATED APPLICATIONS

This application claims priority of provisional U.S. patent application 62/352,613, filed Jun. 21, 2017, which is incorporated by reference.

TECHNICAL FIELD

This technology relates to an apparatus for growing plants under controlled conditions of temperature and humidity in a grow room.

BACKGROUND

A major difficulty in environmental control for indoor agricultural growing facilities is the concentration of heat caused by the high intensity lighting. To resolve this problem systems and techniques exist such as venting the lights, vertically raising the height of the lights, or continuously moving the lights horizontally. However, the glass enclosure required for current venting systems filters certain spectrums of ultraviolet radiation (e.g., UV-B) that are beneficial for many species of plants to thrive. Additionally, raising the height of the lights reduces the intensity of the light resulting in lower plant yields. Finally, current horizontal light moving systems are not vented or wired.

The high-intensity lights used in indoor agricultural growing facilities produce large amounts of heat and consume large amounts of energy. Specifically, an unvented 1,000 W light typically used in commercial growing facilities produces 1,000 W of heat (i.e., 3,412 BTUs). A large indoor growing facility may contain one thousand 1,000 W lights which if left unvented would require 350 tons of cooling capacity.

In addition to maintaining an ideal consistent environmental temperature, it is also ideal to maintain an optimal leaf surface temperature on the plant. Maintaining an optimal leaf surface temperature increases the transpiration rate for the plant thereby increasing the carbon dioxide uptake rate thus increasing overall yield by up to 30%. For example, the optimal leaf surface temperature on a *cannabis* plant is not to exceed 85° F. To maintain this optimal leaf surface temperature growers currently either vertically raise the lights or reduce ambient environmental temperature. Vertically raising the lights lessens the intensity of the light source and thereby results in lower yields. Reducing ambient environmental temperature requires substantial energy consumption and thereby increases overall growing costs.

SUMMARY

In an example of an apparatus for growing plants in a grow room, an enclosure has a window. The enclosure contains a grow lamp that is arranged to direct light downward through the window toward the plants. A blower is coupled with the enclosure to drive a flow of air through the enclosure. A gantry apparatus supports the enclosure in the grow room for movement above the plants.

The enclosure may include a lamp housing that includes the window and contains the grow lamp. The lamp housing may have an air inlet and an air outlet. The enclosure may further include an air supply duct coupled with the air inlet and an air return duct coupled with the air outlet. Additionally, the lamp housing may be one of a plurality of interconnected lamp housings supported by the gantry apparatus for movement above the plants, with each of the plurality of lamp housings containing a grow lamp and having a window, an air inlet, and an air outlet.

Summarized differently, a plurality of grow lamps are interconnected for movement together, and are arranged in a row in positions overlying a line reaching lengthwise of the row. The interconnected grow lamps include a first grow lamp offset laterally toward one side of the line, and a second grow lamp offset laterally toward an opposite side of the line. A gantry apparatus supports the interconnected grow lamps in the grow room for movement above the plants in directions back and forth along the line.

The interconnected grow lamps may further include a pair of third grow lamps located between the first and second grow lamps on opposite sides of the line, with each of the third grow lamps having a wattage less than a wattage of either of the first and second grow lamps.

Thus, to maintain optimal environmental conditions within the growing space, this invention allows for constant ambient environmental temperature, and constant air volume and a closed-loop system resulting in a reduction of heat accumulation of 70% for the vented lights.

For example, to maintain an indoor growing temperature of 78° F. this invention allows for a constant 65° F. entering air temperature with a constant volume of 350 cubic feet/minute vented through each light.

This invention also allows for the integration of new lighting technologies without structural modifications. For example, in one embodiment of this invention 1,000 W high pressure sodium (HPS) lights are alternated with 315 W light emitting ceramic (LEC) lights. In another embodiment of this invention, the 1,000 W lights are alternated with plasma lights. In another embodiment of this invention, the 1,000 Q lights are alternated with light emitting diode lights. As lighting technology continues to advance, the 1,000 W lights could be alternated with such technology without structural modifications to the lighting system.

DETAILED DESCRIPTION

Figure 1:
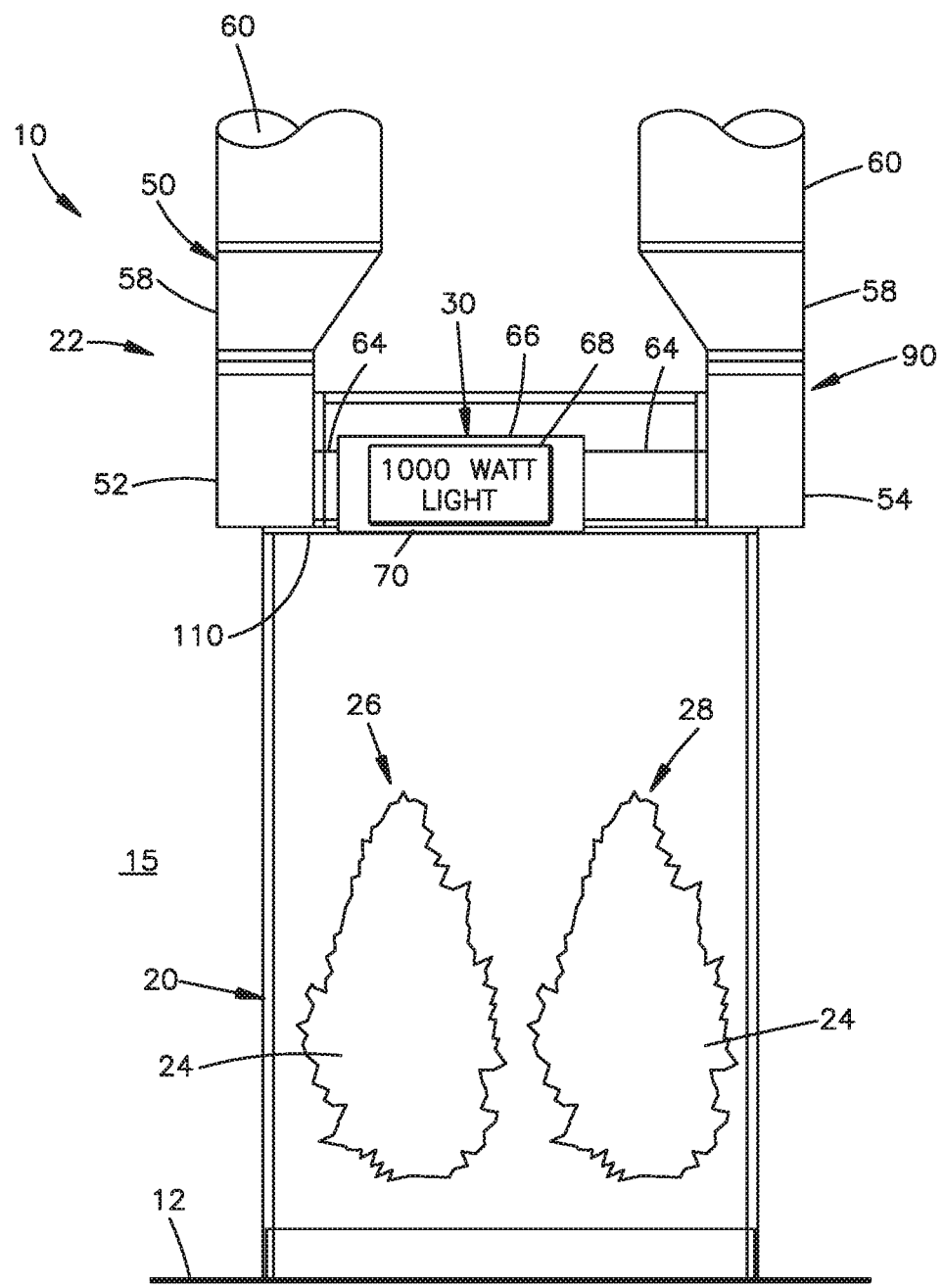
FIG. 1 is an end view of an apparatus for growing plants in a grow room.

The apparatus illustrated in the drawings includes parts that are examples of the elements recited in the claims. The illustrated apparatus thus includes examples of how a person of ordinary skill in the art can make and use the claimed invention. These examples are described here to meet the enablement and best mode requirements of the patent statute without imposing limitations that are not recited in the claims.

As shown in FIG. 1, a grow light apparatus 10 is installed on the floor 12 of a grow room 15. In this example, the apparatus 10 includes a support stand 20 resting directly on the floor 12, and further includes a lighting assembly 22 mounted on the support stand 20. As viewed from above in FIG. 2, the lighting assembly 22 has a rectangular shape with a longitudinal centerline 23. The lighting assembly 22 is thus configured to reach lengthwise over an elongated array of plants 24, such as two adjacent rows 26 and 28 of plants as shown partially in the end view of FIG. 1.

Figure 3:
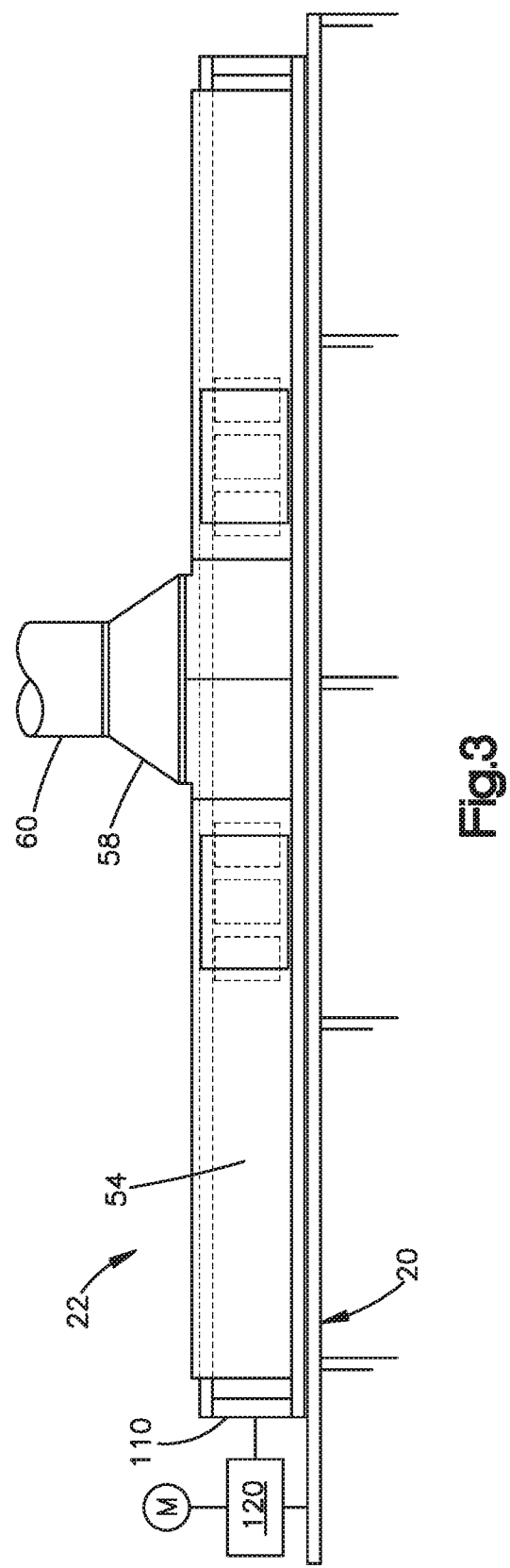
FIG. 3 is partial side view of the apparatus as shown in FIG. 1.
Figure 4:
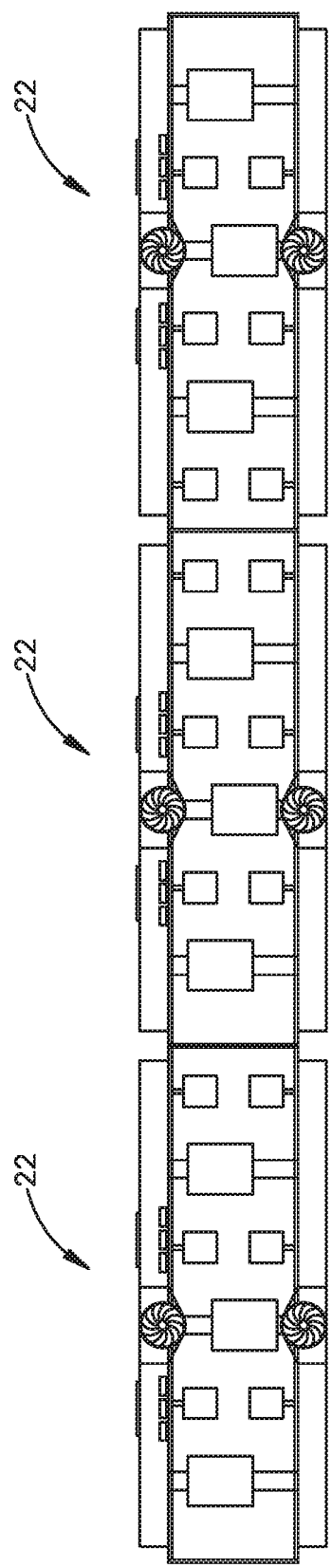
FIG. 4 is top view similar to FIG. 2, showing an alternative embodiment of an apparatus for growing plants in a grow room.

The support stand 20 also has an elongated rectangular shape and, as viewed from the side in FIG. 3, is longer than the lighting assembly 22. This provides a range of movement for the lighting assembly 22 to slide longitudinally back and forth along the support stand 20 in opposite directions parallel to the centerline 23. As further shown in FIG. 4, the grow light apparatus 10 may include interconnected modular lighting assemblies 22 as needed to reach over longer rows of plants 24.

The lighting assembly 22 includes grow light fixtures, and may include multiple grow light fixtures of differing wattage. These may include higher power grow light fixtures 30 and lower power grow light fixtures 32, with each higher power grow light fixture 30 having a wattage higher than the wattage of each lower power grow light fixture 32. In the illustrated example, the higher power grow light fixtures 30 are of equal wattage, such as 1000 W, and the lower power grow light fixtures 32 also are of equal wattage, such as 315 W.

Figure 2:
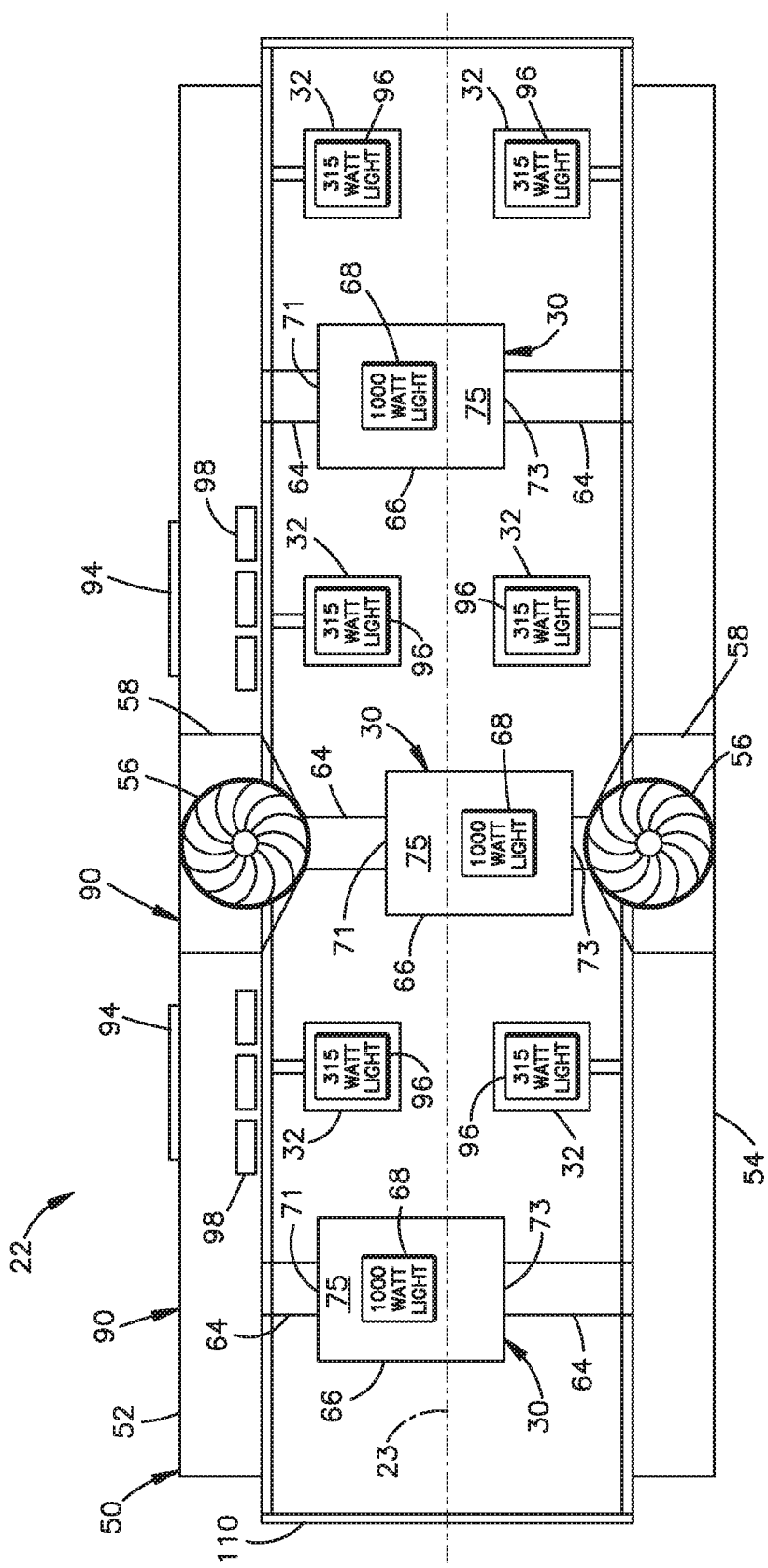
FIG. 2 is top view taken on line 2-2 of FIG. 1.

The lighting assembly 22 further includes a venting system 50. As best shown in FIG. 2, this includes a supply duct 52 reaching along one side of the lighting assembly 22 and a return duct 54 reaching along the opposite side. Either or both of the ducts 52 and 54 can be equipped with a blower 56, and each has a hood 58 through which the duct 52 or 54 communicates with the outdoor atmosphere through additional ductwork 60. Such additional ductwork 60 may have any suitable configuration known in the art.

Figure 5:
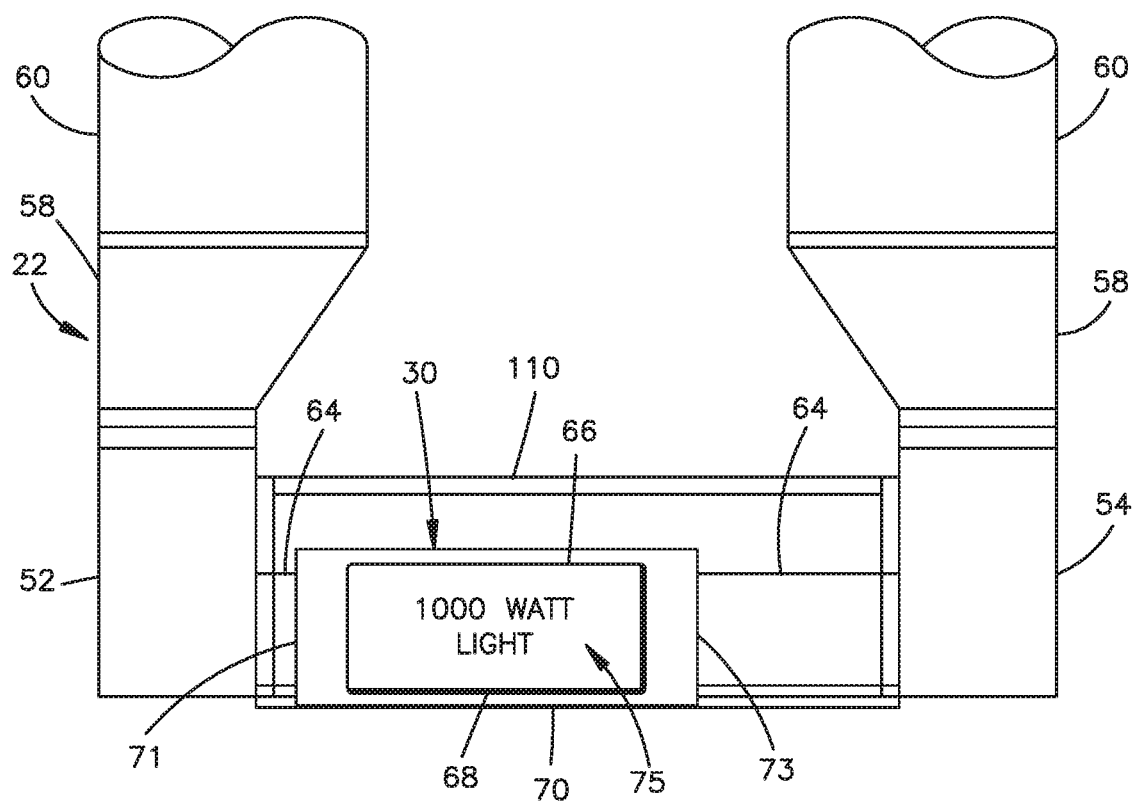
FIG. 5 is an enlarged partial view of the apparatus as shown in FIG. 1.

As further shown in FIGS. 2 and 5, cross ducts 64 reach across the lighting assembly 22 from the supply duct 52 to the return duct 54. The higher power grow light fixtures 30 are installed in the cross ducts 64. Specifically, each higher power grow light fixture 30 in the illustrated example includes a lamp housing 66. Each lamp housing 66 contains one or more higher wattage grow lamps 68, and comprises a light hood with a glass window 70 through which the grow lamp(s) 68 is arranged to direct light downward to the plants 24. Each lamp housing 66 further has an air inlet 71, an air outlet 73, and a plenum 75 reaching through the housing 66 from the inlet 71 to the outlet 73. The inlets 71 receive cooling air from the cross ducts 64. The outlets 73 discharge the cooling air into the cross ducts 64. The grow lamps 68 are arranged in the plenums 75 to be cooled by the air flowing through the plenums 75 from the inlets 71 to the outlets 73.

In this arrangement, the ducts 52, 54, 64 and the lamp housings 66 together define an enclosure 90 in which the higher wattage grow lamps 68 are contained in an air flow path that vents them to the outdoor atmosphere in isolation from the indoor atmosphere of the grow room 15. This is beneficial for controlling the temperature and humidity of the grow room 15 without introducing outdoor air and the contaminants that may be present in the outdoor air.

The higher wattage grow lamps 68 may include fluorescent lamps, ceramic lamps, plasma lamps, LED's, or any other lamps suitable for providing light needed for plant growth. In the illustrated example, the higher wattage lamps 68 are high pressure sodium lamps with ballasts 94. The ballasts 94 may also be contained in the enclosure 90 for cooling in the flow of outdoor atmospheric air, as shown in the drawings.

The lower power grow light fixtures 32 also may include fluorescent lamps, ceramic lamps, plasma lamps, LED's, or any other lamps suitable for providing light needed for plant growth. In the illustrated example, the lower power grow light fixtures 32 include fluorescent grow lamps 96 with ballasts 98. These ballasts 98 are preferably contained in the enclosure 90 for cooling, but unlike the higher wattage lamps 68, the lower wattage lamps 96 are not contained in the enclosure 90. Instead, the lower power fixtures 32 are open such that the lower wattage lamps 96 are exposed to the indoor atmosphere of the grow room 15 to direct ultraviolet light downward toward the plants 24 without obstruction by a window.

Figure 6:
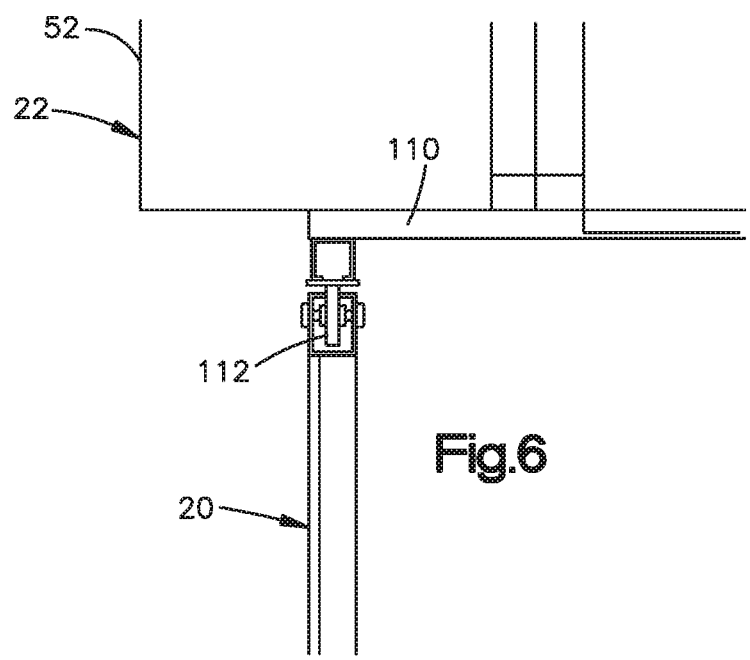
FIG. 6 is an enlarged partial view of the apparatus as shown in FIG. 1.
Figure 7:
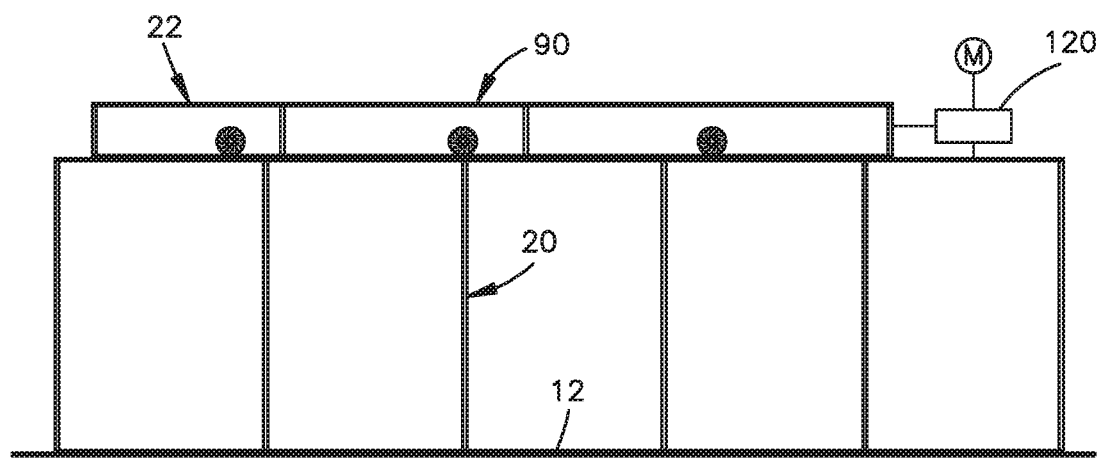
FIG. 7 is another partial side view of the apparatus as shown in FIG. 1.
Figure 8:
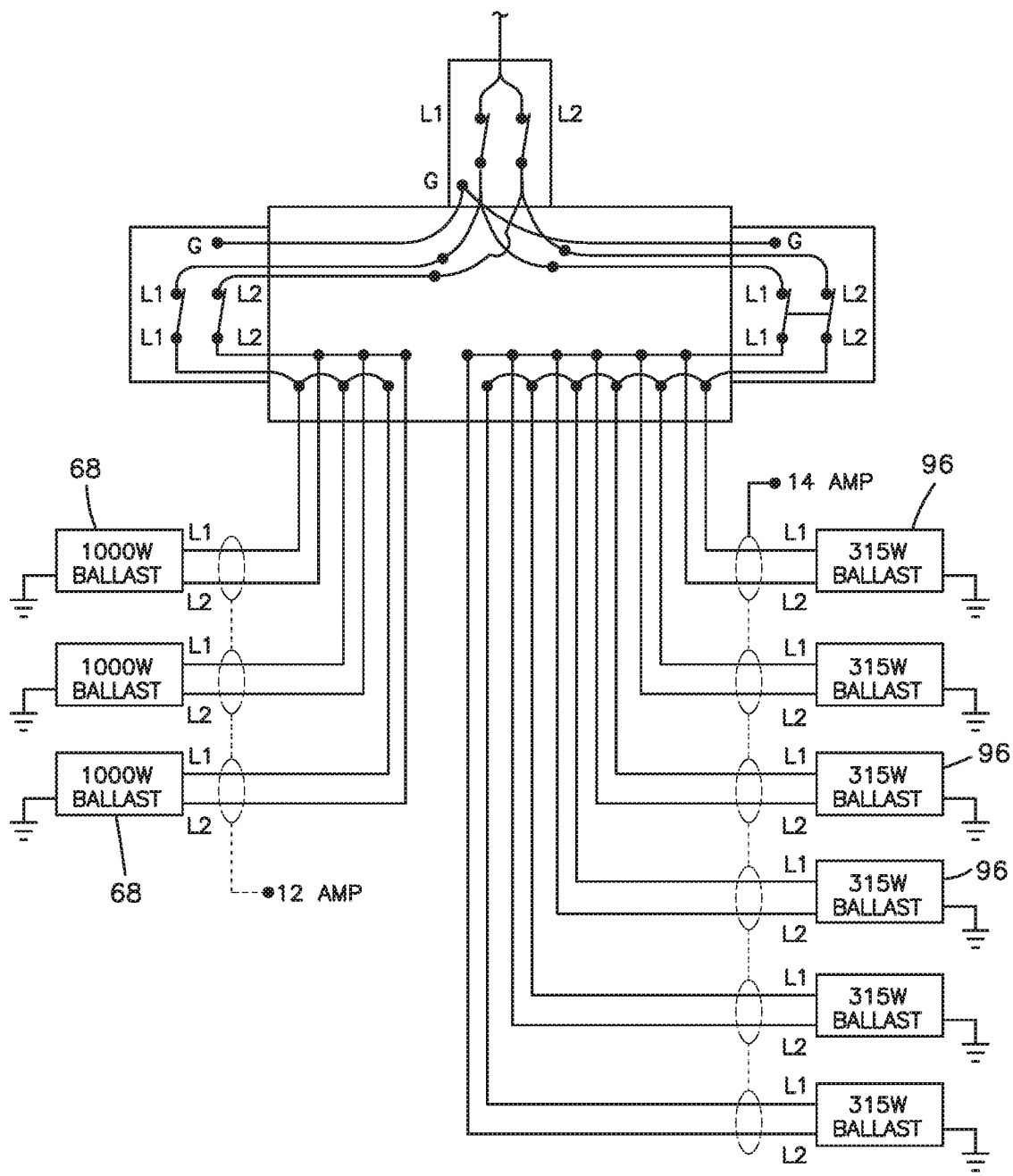
FIG. 8 is a wiring diagram for grow lamps in the apparatus of FIG. 1.

In addition to the venting system 50, the grow light fixtures 30, 32, the ballasts 94, 98 and their associated wiring (FIG. 8), the lighting assembly 22 includes a frame 110 upon which the other components of the lighting assembly 22 are interconnected. As shown partially in FIG. 6, the frame 110 rests on rollers 112 at the top of the support stand 20. The support stand 20 is thus configured as a gantry apparatus supporting the lighting assembly 22 for movement longitudinally back and forth over the rows 26 and 28 of plants, 24 as described above. A motorized driving assembly 120, as shown schematically in FIGS. 3 and 7, is operatively connected between the support stand 20 and the lighting assembly 22 to move the lighting assembly 22 in manner simulating movement of the sun across the sky.

Additional features of the lighting assembly are shown in FIG. 2. In this example the lower power grow light fixtures 32 are equally spaced laterally from the centerline 23 in pairs located between adjacent higher power grow light fixtures 30. The higher power grow light fixtures 30 are arranged in a row along the centerline 23. Those fixtures 30 overlie the centerline 23, but adjacent fixtures 30 in the row are staggered so as to be laterally offset toward opposite sides of the centerline 23. This extends the width of the area lighted by the higher power fixtures 30 along the path of movement of the lighting assembly 22, and also reduces the concentration of higher energy light provided along the center of the path of movement.

This written description sets for the best mode of carrying out the invention, and describes the invention so as to enable a person of ordinary skill in the art to make and use the invention, by presenting examples of the elements recited in the claims. The detailed descriptions of those examples do not impose limitations that are not recited in the claims, either literally or under the doctrine of equivalents.

What is claimed is:

1. An apparatus for growing plants in a grow room, comprising:
   an enclosure having a window and containing a grow lamp arranged to direct light downward through the window toward the plants;
   wherein said enclosure is sealed off from internal air and the plants contained in the grow room;
   wherein said grow room is adapted to prevent sunlight from entering the grow room;
   a blower coupled with the enclosure to drive a flow of external air through the enclosure; and
   a gantry apparatus supporting the enclosure in the grow room for movement above the plants.

2. An apparatus as defined in claim 1 further comprising ductwork communicating the blower and the enclosure with the external air along a flow path bypassing indoor atmosphere in the grow room.

3. An apparatus as defined in claim 1 wherein the enclosure includes a lamp housing that includes the window and contains the grow lamp, the lamp housing has an air inlet and an air outlet, and the enclosure further includes an air supply duct coupled with the air inlet and an air return duct coupled with the air outlet.

4. An apparatus as defined in claim 3 wherein the air supply duct reaches from the blower to the air inlet.

5. An apparatus as defined in claim 3 wherein the lamp housing is one of a plurality of lamp housings that are interconnected for movement together, and are supported by the gantry apparatus for movement above the plants, with each of the plurality of lamp housings containing a grow lamp and having a window, an air inlet, and an air outlet.

6. An apparatus as defined in claim 1 further comprising an additional grow lamp located outside the enclosure and arranged to direct ultraviolet light downward toward the plants without obstruction by a window, the additional grow lamp is interconnected with the enclosure for movement with the enclosure, and the gantry apparatus further supports the additional grow lamp for movement above the plants with the enclosure.

7. An apparatus for growing plants in a grow room, comprising:
- a plurality of grow lamps that are interconnected for movement together, the grow lamps being arranged in a row in positions overlying a line reaching lengthwise of the row, and including a first grow lamp offset laterally toward one side of the line and a second grow lamp offset laterally toward an opposite side of the line;
- wherein each of the first and second grow lamps is contained in an enclosure that has a window and is vented to outdoor atmospheric air in isolation from the indoor atmosphere and the plants of the grow room; and
- a gantry apparatus supporting the interconnected grow lamps in the grow room for movement together above the plants in directions back and forth along the line.

8. An apparatus as defined in claim 7 wherein the interconnected grow lamps further include a pair of third grow lamps located between the first and second grow lamps on opposite sides of the line.

9. An apparatus as defined in claim 8 wherein each of the third grow lamps is exposed to the indoor atmosphere of the grow room without obstruction by a window.

* * * * *